June 9, 1942.    F. DE BUIGNE    2,285,910
TORQUE CONVERTER
Filed May 31, 1941    7 Sheets-Sheet 3
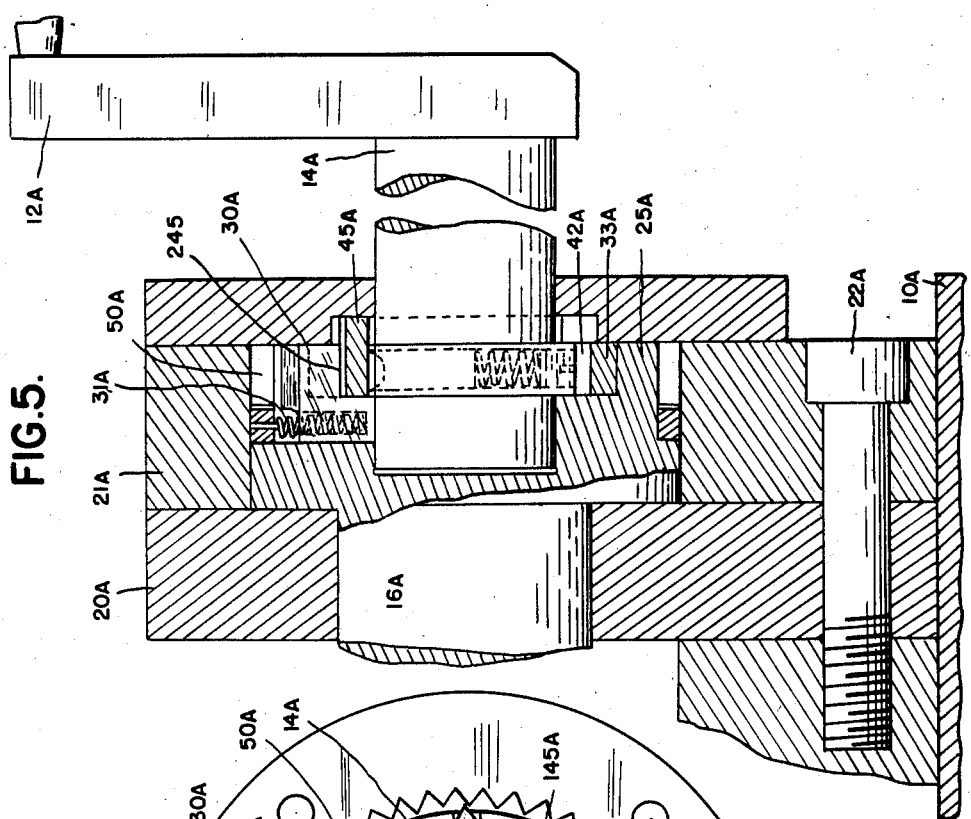
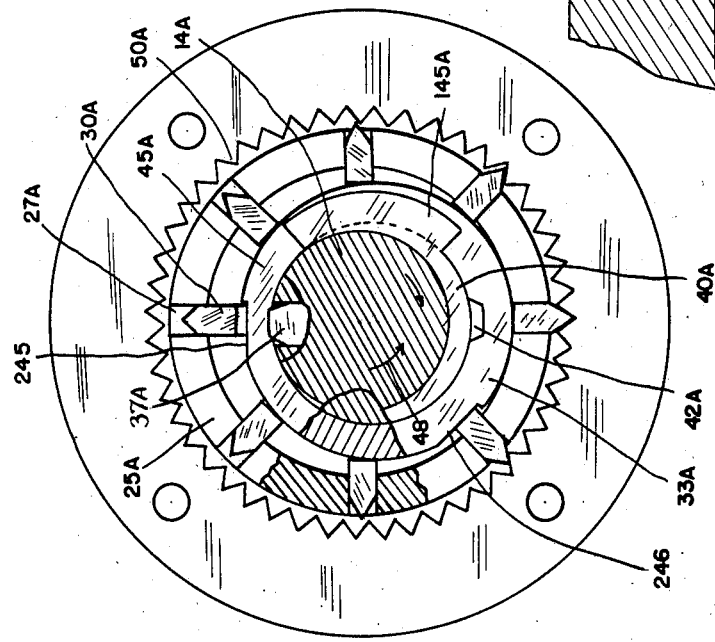
INVENTOR.
FRANK DeBUIGNE
BY
ATTORNEYS

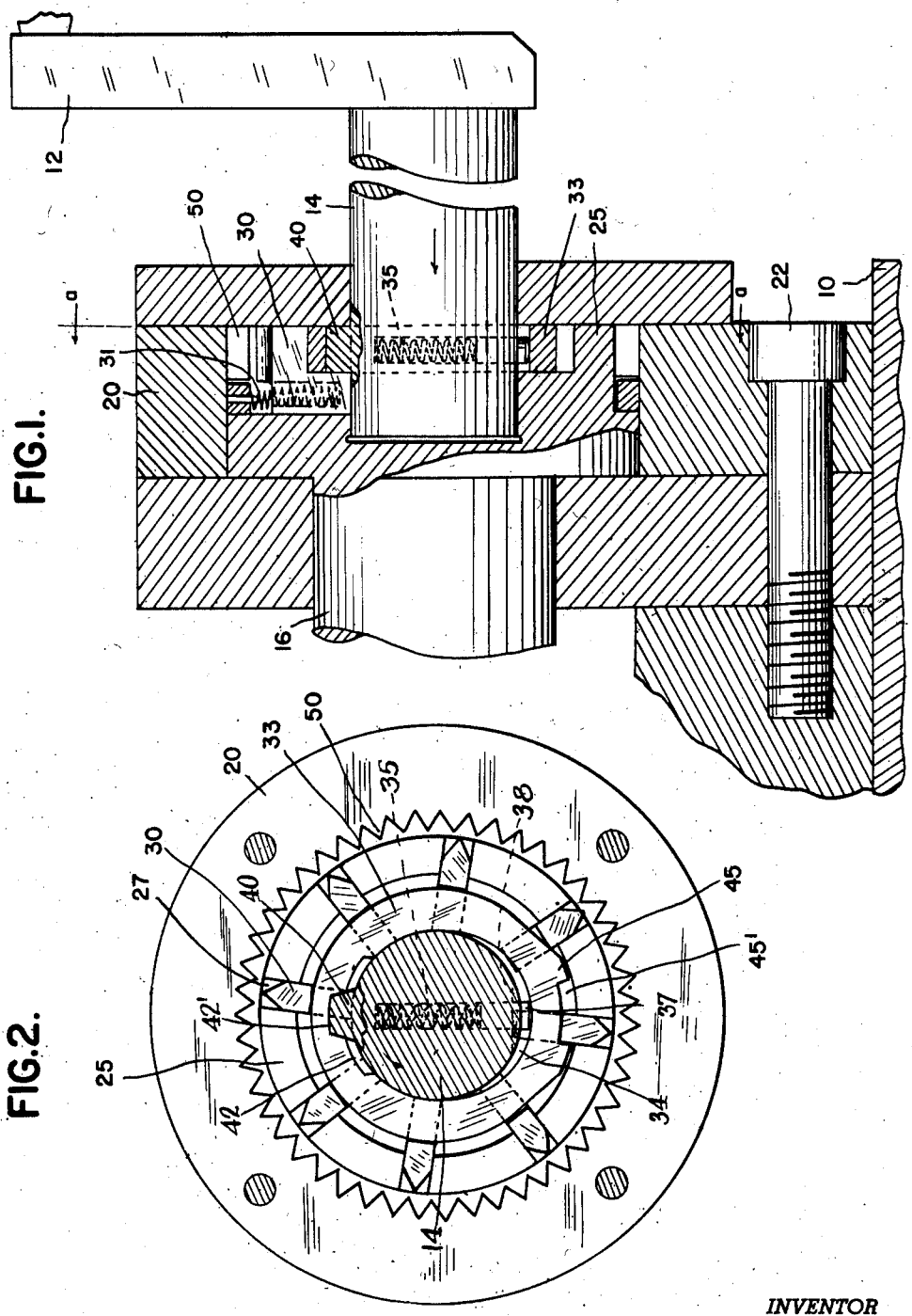

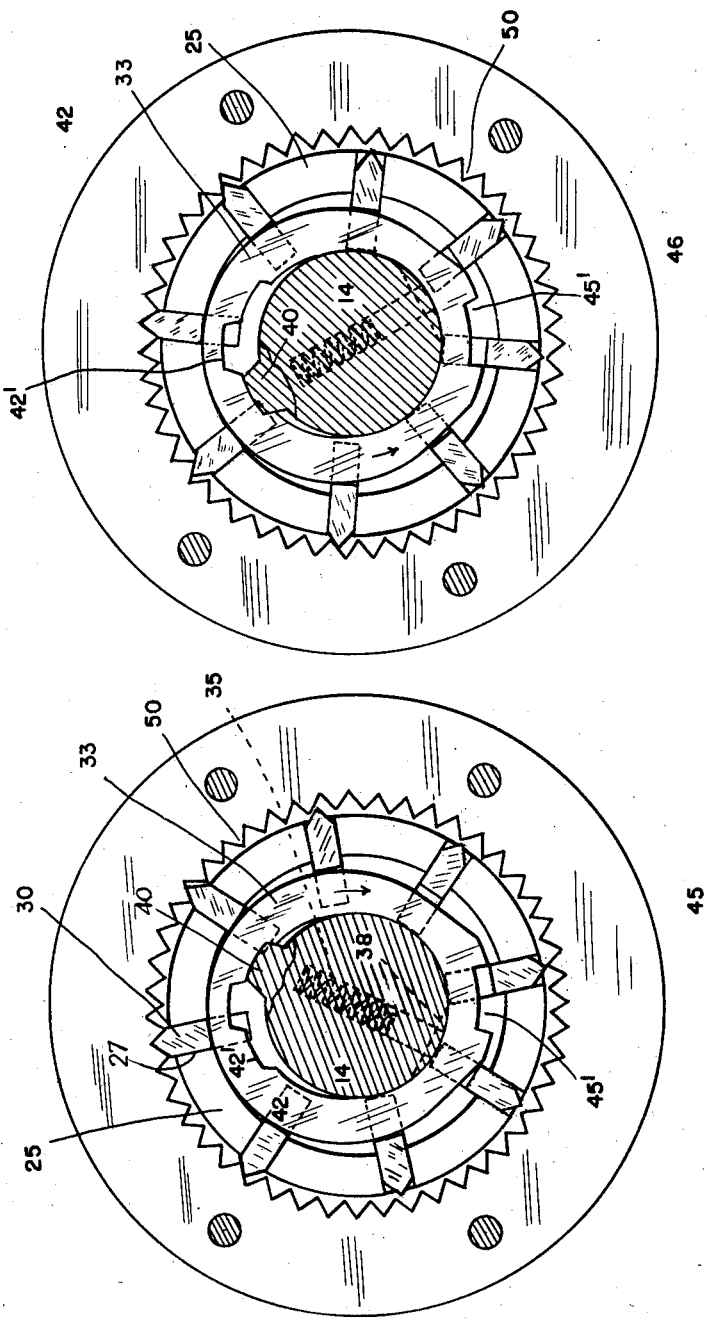

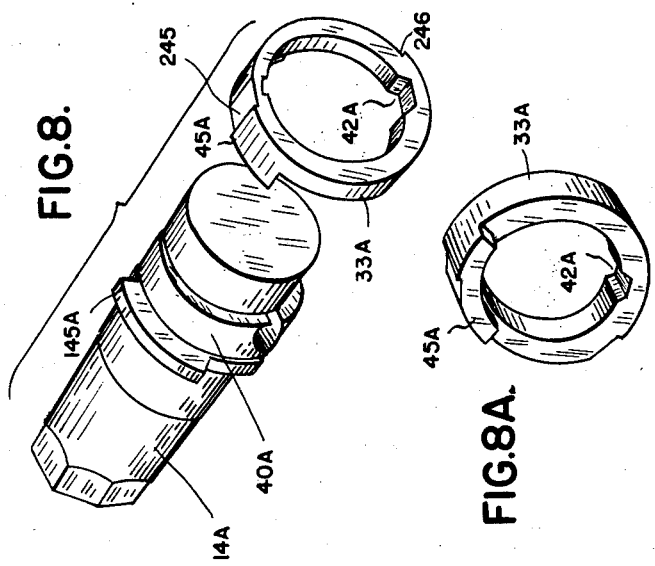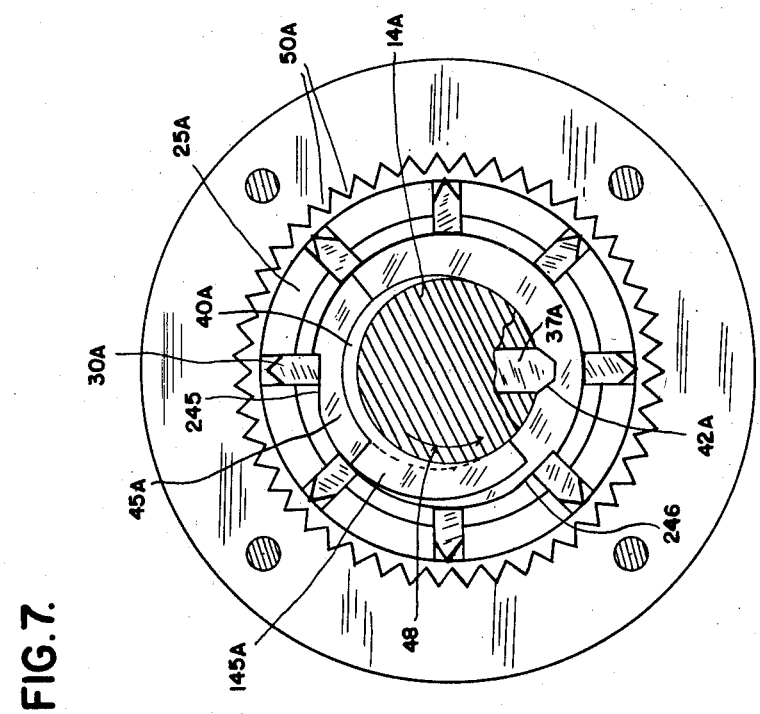

June 9, 1942.  F. DE BUIGNE  2,285,910
TORQUE CONVERTER
Filed May 31, 1941  7 Sheets-Sheet 5

INVENTOR.
FRANK DeBUIGNE
BY
ATTORNEYS

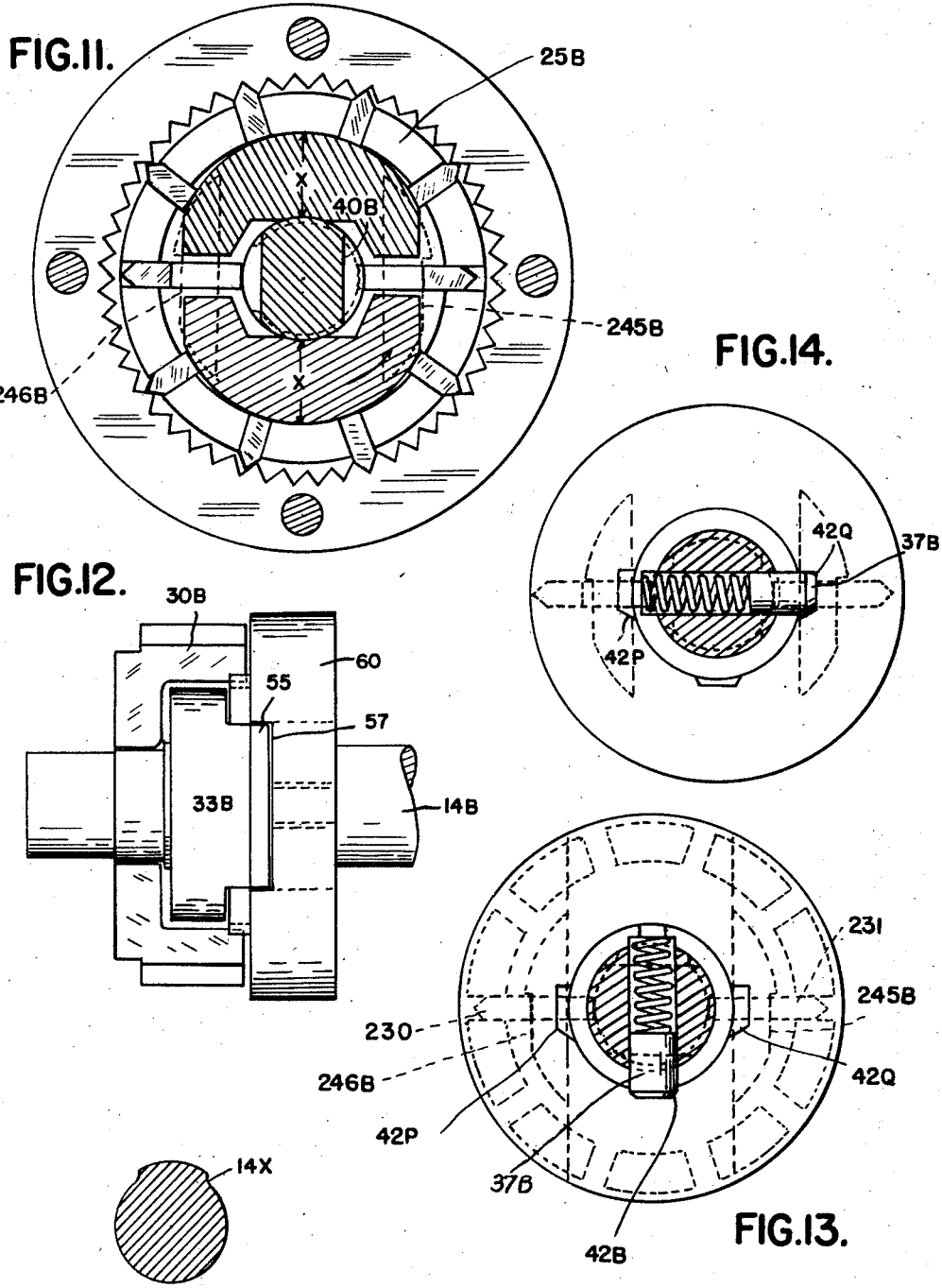

June 9, 1942.                F. DE BUIGNE                    2,285,910
                            TORQUE CONVERTER
                          Filed May 31, 1941            7 Sheets-Sheet 7
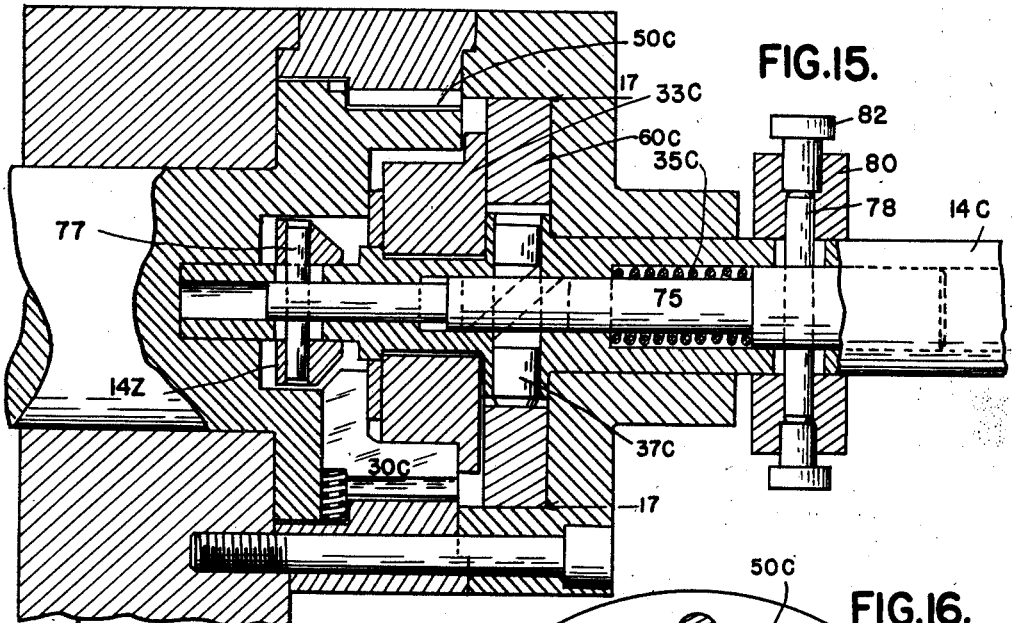
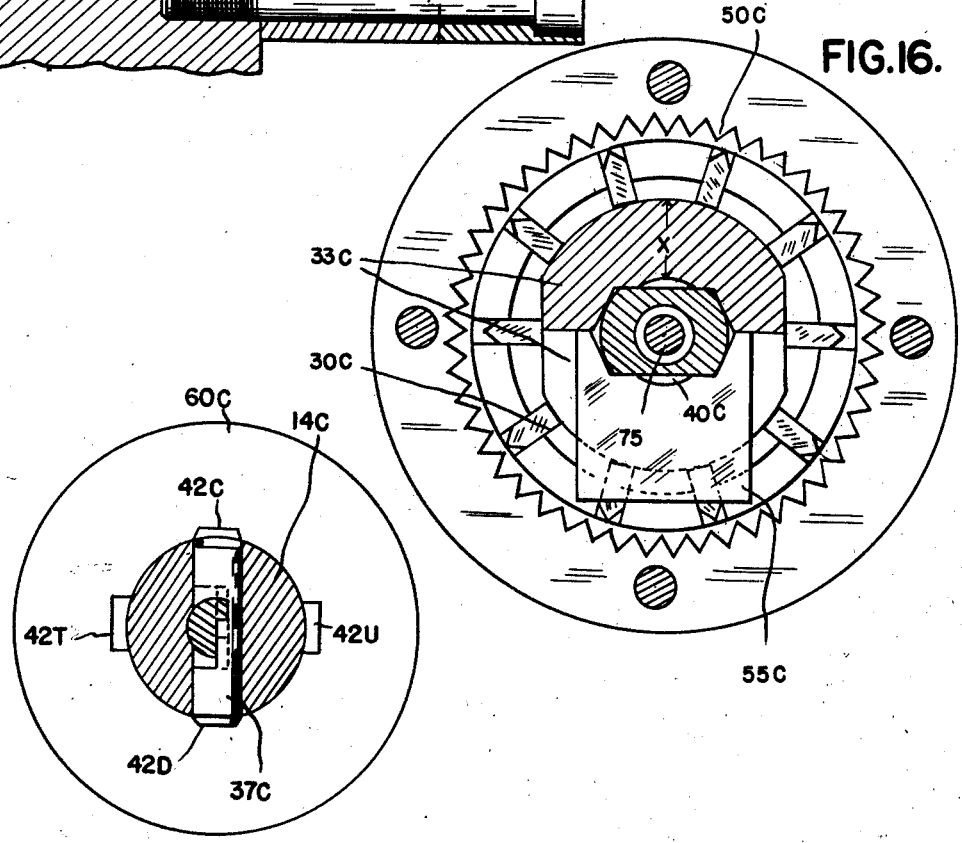
INVENTOR
FRANK DeBUIGNE
BY
ATTORNEYS Patented June 9, 1942

2,285,910

UNITED STATES PATENT OFFICE 2,285,910

TORQUE CONVERTER

Frank De Buigne, Ferndale, Mich.

Application May 31, 1941, Serial No. 396,062

20 Claims. (Cl. 74—63)

This invention relates to torque transmitting and converting devices, and particularly to such devices incorporating improved automatic ratio-changing means.

While disclosed in connection with hand-operated apparatus designed for and particularly useful in connection with the clamping of work in machine tools and the like, the invention is equally applicable to many other uses and devices, both power and hand-operated.

An important object of the invention is to provide an extremely simple, compact, rugged and powerful device incorporating torque converting means of high ratio, and also incorporating a direct drive or lower torque drive, and having automatic ratio changing means adapted to respond to variations in the load imposed upon the apparatus in such manner as to change the torque ratio to suit the load.

An object related to that last stated is to provide such a mechanism in which the torque converting means is positive and powerful in action, and in which the automatic torque changing mechanism is also of simple and sturdy construction, and in which the torque conversion is effected quickly and positively, in response to a predetermined change of load upon the device.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a longitudinal cross section of a power conveying and torque converting device incorporating the principles of the present invention.

Figures 2, 3 and 4 are vertical sectional elevational views taken substantially on the line a—a of Figure 1 and looking in the direction of the arrows, showing the parts in different positions which they assume under various operating conditions.

Figure 5 is a view similar to Figure 1 of a somewhat modified construction.

Figures 6 and 7 are sectional views similar to Figures 2 and 3 and showing the corresponding parts of the modified embodiment in different positions occupied thereby during operation of the device.

Figure 8 is a perspective view of the driving shaft, eccentric and driving ring portions removed from the assembly.

Figure 8A is a perspective of the opposite side of the driving ring.

Figure 9:
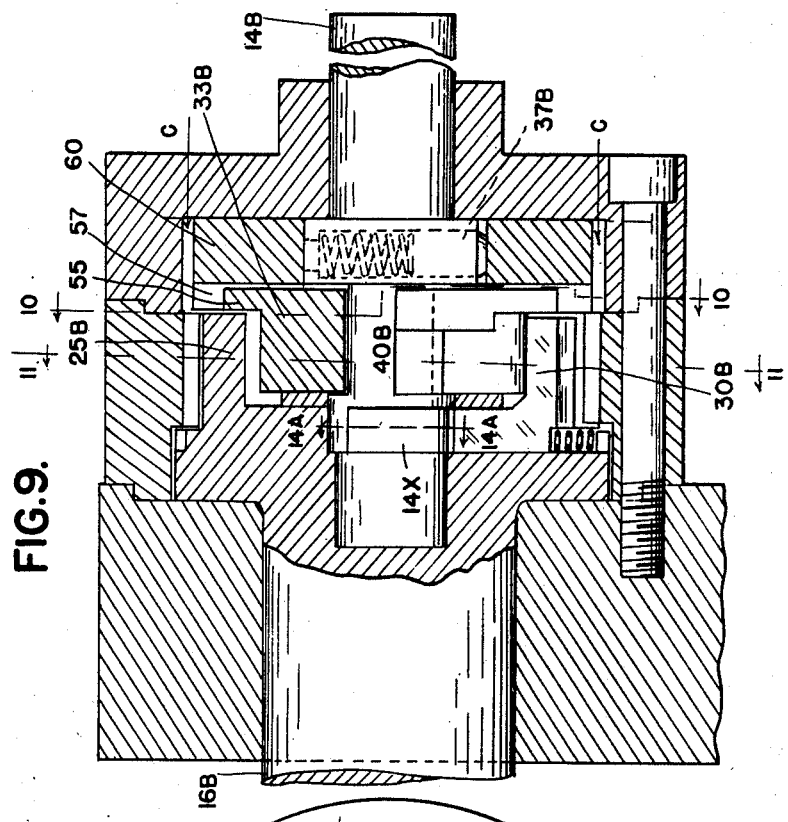
Figure 9 is a view similar to Figure 1 showing another modification.
Figure 10:
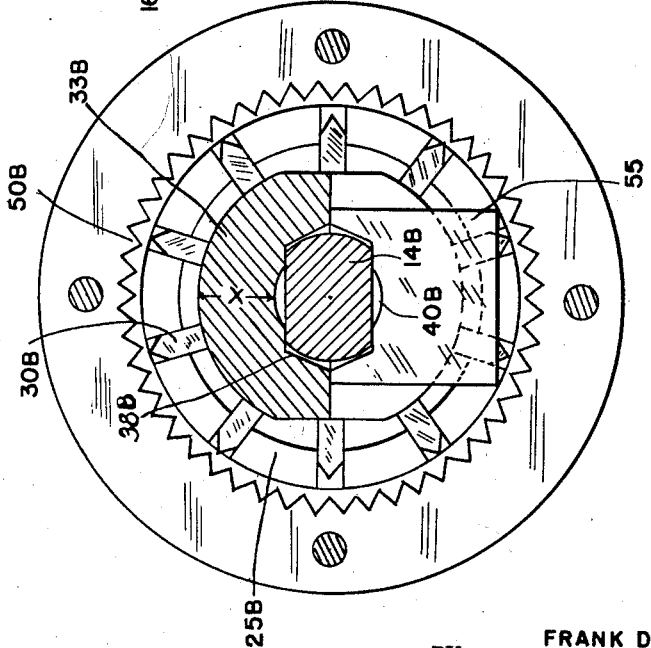

Figures 10 and 11 are cross sectional views thereof taken substantially on the lines 10—10 and 11—11 respectively of Figure 9.

Figure 12 is a view in side elevation, taken at right angles to Figure 9 and with the rack ring removed.

Figures 13 and 14 are cross sectional views taken substantially on the line C—C of Figure 9, and looking in the direction of the arrows.

Figure 15 is a view similar to Figure 9 but showing another modified construction.

Figure 16 is a cross section thereof corresponding to Figure 10.

Figure 17 is a sectional detail taken on the line 17—17 of Figure 15, and looking in the direction of the arrows.

Referring now to the drawings, reference character 10 designates a table or other support, which, in the illustrative embodiment disclosed in Figures 1-4 may comprise the bed of a machine tool (otherwise unshown) upon which any desired work piece or other part (also unshown) is desired to be clamped or held. It is assumed that the clamping and release of the work is to be controlled by means of a crank handle as 12 attached to a shaft 14, which constitutes the driving shaft of the transmission mechanism. The clamping or holding effort is exerted by a driven shaft 16, the holding means itself being unshown. The driving and driven shafts are coaxially mounted in and project from opposite sides of the generally cylindrical casing 20 which is attached as by lag bolts 22 to the base 10. The driving shaft projects through the torque converting mechanism and is piloted in the driven shaft.

Integral with or otherwise rigidly attached to the driven shaft 16 is a substantially cylindrical cage 25 concentric with the shafts, rotatable in the housing and provided with a plurality of radial slots as 27 in each of which a radially slidable drive plunger 30 is mounted. The outer ends of the plungers are tapered, as viewed from the end (Figures 2-4), while their inner ends are transversely stepped, as shown in Figure 1. The stepped portion is so proportioned that at times the longer part rides upon the shaft 14, while at other times the shorter part rides upon the ring 33, as will be more fully apparent as the description proceeds. A spring 31 urges each plunger inwardly.

The ring 33 is arranged between the driving shaft 14 and driven cage 25, and is adapted to be driven by the driving shaft but is limitedly rotatable and limitedly transversely shiftable with respect thereto. The transverse shifting movement is permitted by virtue of the elongation of the internal opening 34 in the ring. The independent shifting and the conjoint action of a spring-pressed detent plunger 37 trapped in the shaft and acting radially against the ring, and a driving lug 40 fixedly projecting from a diametrically opposite part of the shaft and engaged in a stepped slot 42—42' formed in the inner surface of the ring.

The central portion 42' of the internal slot in ring 33 is of a size and depth to receive and snugly fit the driving lug 40, which is normally maintained therein by the reaction of the detent spring 35. When in this position, the major part of the periphery of the ring is concentric with the axis (Figure 2). Circumferential extensions of the slot 42 project upon either side of the central portion 42' and are shallower, as indicated, to an extent corresponding to the lateral shifting travel of the ring permitted by the elongated opening 34 therein. The sides of the lug 40 and of the deep section 42' of the slot are inclined, and the lug itself acts as a cam to shift the ring laterally, when the ring is restrained against rotation with the driving shaft by a predetermined increase in the torque load upon the device, at which time the parts shift to one of the positions shown in Figures 3-4. This moves the ring to an eccentric position, and further rotation of the driving shaft with relation thereto is restrained by engagement of the driving lug with the end of the slot. The outer periphery of the ring is circular, except for a slotted cam lobe section 45 diametrically opposite the internal slot 42—42'. The external slot 45' in the cam section 45 of the ring, is provided at its ends with abrupt radial shoulders. It will also be noted that the portion 38 of the shaft 14 opposite the driving lug 40 is flattened. With the ring 33 in either of its eccentric positions shown in Figures 3 and 4, its rotation by the driving shaft 14 (in the direction indicated by the arrow in each view) causes the drive plunger to be successively reciprocated in the cage portion 25. During its outward movement, each plunger is forced into camming engagement with the sloping side of one of the internal tapered teeth 50, formed upon the inner surface of the opening in the casing 20 and concentric with the axis. Teeth 50 are shaped to cooperate with the tapered ends of the plungers, and constitute a rack against which the plungers may react. The spacing of the teeth 50 is so related to the spacing of the plungers 30 and to the actuation of the latter by the eccentric ring 33, that each plunger, as it is forced outwardly, bears against a corresponding sloping face of one of the teeth, to thereby force the cage 25, and resultantly the driven shaft 16, forward in a desired direction by a camming action. A torque multiplication is thereby secured, dependent upon the slope of the tooth surfaces and of the travel of the plungers. This principle of torque multiplication is already known, and is commonly designated as a "heliocentric" drive. Insofar as I am aware, however, satisfactory means has not heretofore been proposed whereby the ratio of such a driving means may be changed automatically, so that the driven shaft may be rotated at a lower torque ratio when desired, for example. Thus in clamping work in a machine tool, a high torque multiplication is necessary to securely position the work, yet during the initial movement of the jaws or other holding means toward the work, since this represents a period of no load, it is advantageous to provide a higher speed, lower torque drive. This desirable change in torque ratio is automatically effected by my improved mechanism, the operation of which is as follows:

With no load upon the driven shaft 16, and with ring 33 in the concentric position of Figure 2, the plungers are drawn in, and all clear the rack teeth 50, as shown in Figure 2. One of the plungers engages in the peripheral slot or notch 45'. The spring pressed plunger 37 tends to maintain the ring in the concentric position with a predetermined force, so that when the driving shaft is turned, the ring turns with it, while remaining in the concentric position. An end wall of the slot or notch 45', engaging the plunger 30 which lies in the slot, drives such plunger, and accordingly turns the cage 25, and thereby the driven shaft, at the same speed as the driving shaft. It will be noted that the plunger is able to fall into the notch 45' by virtue of the flat 38 on the driving shaft. The direct drive is maintained until the load upon the driven shaft exceeds a predetermined value corresponding to the friction imposed by spring-pressed plunger 37 and that due to the engagement of lug 40 in slot 42'. When the load on the driven shaft rises above such predetermined value, the restraining effort exerted upon the cage 25 also restrains the ring 33, by virtue of the engagement between notch 45' and one of the plungers, as previously described. The continued driving effort then exerted upon the shaft 14 cams the ring 33 to the eccentric position, compressing the spring 35. The ring shifts far enough to free the slot 45' from its engagement with the plunger therein, and all of the plungers may then travel freely across the notch 45' without falling thereinto, the inner ends of the plungers simply riding on the surface of shaft 14, flattened section of which is moved out of alignment with the slot 45 as the shaft turns with relation to the ring. The diameter of that portion of the shaft which lies directly under the trailing end of slot 45' will be seen to be sufficient to move each plunger outwardly so that it may clear the end of the slot 45' as the ring is rotated with relation to the plungers and their cage 25. The manner in which the plungers clear the edge of notch 45' is illustrated in Figure 3. The plungers are thus reciprocated by the rotating eccentric in the conventional manner of heliocentric drives.

If the driven means connected to the shaft 16 is a work-clamping device, it will be recognized that a rapid approach of the jaws or other holding means may be effected through the agency of the direct drive, with the ring in the position of Figure 2, while when the jaws or holding means encounter the work, and greater resistance or load is imposed, the shifting to the high ratio takes place automatically to initiate the heliocentric reducing action in the manner described.

Under such conditions, the apparatus may remain with its several parts in the position shown in Figure 3, with the work clamped in place. At the first reverse rotation of the shaft 14, the ring 33 snaps down into the concentric position as the lug 40 moves into registry with the notch position 42', and when one of the plungers engages the opposite end of slot 45', the direct drive becomes available in the reverse direction. In reversed direction also, however, with this construction, the mechanism shifts to the high ratio automatically if the resistance to movement of the shaft 16 is too great, the operation being exactly as in the forward direction, as will be recognized. The reverse high ratio position is shown in Figure 4.

In the modified construction shown in Figures 5-8, in which parts analogous to those already described are designated by like references distinguished by the addition of the letter A, a floating ring 33A is also provided, and is in a corresponding but somewhat different manner shiftable from a concentric position in which a direct drive is effective to an eccentric position in which it provides a heliocentric drive of high torque ratio. The shifting of the ring is effected by means of an eccentric 40A fixed to and shown as integral with the driving shaft 14A and fitting the circular interior of the ring. The throw of the eccentric 40A corresponds to the eccentricity of the inner and outer peripheries of the ring 33A, so that when the point of maximum throw of eccentric 40A registers radially with the thinnest part of the ring, the outer periphery of the latter is concentric with the central axis. In this position, as shown in Figure 7, the plungers 30A are withdrawn and clear the teeth 50A, and a spring-pressed detent 37A, having inclined sides, projects into an internal notch 42A in the ring, imposing predetermined resistance to independent rotation of these parts. Cooperating segmental abutment portions 45A, 145A, carried by the ring and by shaft 14A, limit the relative rotation of these parts to ½ revolution, stopping such relative rotation in proper positions to halt the shifting movement of the ring as the latter reaches its eccentric and concentric positions.

In this embodiment the high torque drive is imparted in one direction only, but direct drive is effective in both directions. Thus in a work holder or the like, the high torque effort is applied, after initial advance of the holding means in the direct drive ratio, when the holding parts encounter the work, while return of the holding parts to retracted position is also effected in the direct drive ratio. Direct drive is provided by oppositely facing abutments formed by inclined notches or flats 245, 246 cut at spaced points in the periphery of the ring 33A and each adapted to engage the side of one of the plungers to rotate the cage and so the driven shaft at the speed of the driving shaft for direct drive. The shoulder provided by notch 245 is utilized for direct drive in the forward direction when the ring is in the eccentric position, because the plungers then bottom against the shaft and cannot enter the notch, as will be apparent from an inspection of Figures 5 and 6. The abutment provided by flat 246, being formed in a thicker portion of the ring is always effective to provide a reverse drive at the 1 to 1 ratio, since the portion of the ring in which it is formed is thick enough to prevent the plungers from bottoming on the shaft. The plungers simply ratchet over notch 246 during the forward drive at the high torque ratio.

As shown in Figure 7, the detent 37A is seated in the notch 42A when the parts are in the direct drive position. The direction of forward drive is indicated in that view by an arrow. It is to be noted that the shoulder formed by the flat 245, being raised by the cam portion 40A, engages one side of one of the plungers 30A. With the parts in this position, the ring 45A turns with the driving shaft, and so turns the plunger seated in the flat 245, and accordingly the cage 25A and the driven shaft 16A attached thereto.

When the parts are in the direct drive position of Figure 7, the segmental abutment portion 145A, which is rigidly attached to the driving shaft 14A, lies adjacent the similar segmental abutment portion 45A attached to the ring, but in advance of the latter, considered from the standpoint of direction of rotation of these parts. The total angular length of the portions 45A, 145A comprise 180°. When the load upon the driven shaft increases to such point that the detent plunger 37A is cammed inwardly and is freed from the notch 42A, due to the restraining effect of the increased load upon the ring 45A, the abutment portion 145A leaves the portion 45A, turns a half revolution, and again strikes the abutment portion 45A at the opposite end of the latter. During such half revolution, the eccentric 40A leaves its position in alignment with the thinnest section of the ring 45A, and moves into alignment with the thickest section of the ring, causing the periphery of the latter to become eccentric and project to a desired degree, the degree of eccentricity being such as to adapt the ring to act as an actuating cam for the drive plungers 30A. During such lateral shifting of the ring, the shoulder formed by flat 245 moves inwardly to clear the inner ends of the plungers, and the ring is then free to revolve with relation to the plungers in the direction of the arrow 48, and actuate the same as in the first embodiment. The successively reciprocated plungers react in like manner against rack teeth 50A, to advance the cage and accordingly the driven shaft at the high torque ratio.

When the direction of rotation of the driving shaft is reversed, the parts return to the position in which they are shown in Figure 7. The direct drive is then effective in the reverse direction, the driven shaft being turned through one of the plungers 30A, which seats in the flat 246 and is driven by the shoulder provided by the latter.

In a further modification shown in Figures 9 to 14, the high torque ratio is somewhat reduced by providing for reciprocation of the plungers twice during each complete revolution of the driving shaft. The driving shaft 14B is piloted at its end in the driven shaft 16B. A portion of the driving shaft lying within the cage 25B is flattened upon both sides, as indicated at 40B. Surrounding the flattened portion of the driving shaft are a pair of semi-cylindrical cam plates 33B, having central cut-out portions 38B cooperating to form a substantially rectangular central opening, of such size that when the flattened portions 40B of shaft 14B extend lengthwise within such rectangular opening, as shown in Figure 10, the cam plates 33B lie close together in a retracted position in which they cannot actuate the plungers, which are withdrawn from operative engagement with the rack teeth 50B. When the flattened portion of the shaft is turned to the perpendicular position shown in Figure 11, the cam plates are separated, and project so that the central portion of each, constituting its highest part, may force the plungers successively outwardly as the cam plates, which turn with the driving shaft, revolve within the plungers and their cage. It will be noted that the peripheries of the cam plates are non-concentric, when projected in this manner, each being higher at its mid portion. They thus provide two actuating cams, and the plungers 30B are accordingly reciprocated at twice the frequency of the plungers of the previously described embodiments. Under like conditions the high torque ratio is thereby reduced by one half.

Each cam plate is provided with an integral outwardly projecting guide plate section 55, and each such guide section is radially slidable in one of a pair of slideways 57, extending diametrically across the face of a driving disc 60. Disc 60 is free on the driving shaft 14B, but independent rotation thereof is restricted by a spring-pressed detent 37B, which is adapted to engage, at different times, in either of three different notches, 42B, 42P, 42Q. The notch 42B slopes upon both sides, in conforming with the end of the detent. The detent can therefore move out of this notch in either direction, if the force tending to move the shaft with relation to the disc, or vice-versa, is sufficient to overcome the resistance of the detent spring 35B. The notches 42P, 42Q are so formed, however, that the detent, upon entering either of them, can only return in the direction of the central notch 42B, as will be apparent from an inspection of Figure 13, the abrupt sides of the notches 42P, 42Q preventing further turning in a direction which would carry the detent beyond these notches. It will be noted upon inspection of Figure 13 that when the detent is in the central notch 42B, the flattened section 40B of the driving shaft lies parallel to the longer sides of the rectangular opening 38B formed in the cam plates, so that the latter are permitted to move inwardly toward the center and are unable to reciprocate the plungers 30B. Each of the notches 42P, 42Q is 90° from the notch 42B, however, so that the relative turning of the shaft with relation to the disc 60, and accordingly with relation to the cam plates which are keyed to the disc, is such that the flat portion of the driving shaft is permitted to turn to the perpendicular position, and project the cam plates, as in the embodiments previously described. Thereafter, continued turning of the driving shaft turns the cam plate assembly positively, and reciprocates the plungers to provide the high torque drive.

Direct drive of the driven shaft when the cam plates are retracted occurs through one of the plungers, as in the previous embodiments. When the cam plates are retracted, the inner ends of the plungers bear against a portion 14X of the driving shaft, intermediate its piloted end and the flattened section 40B thereof. The section 14X is so cut away as to allow certain of the plungers to move inwardly sufficiently to engage shoulders formed by flats 245B, 246B in the peripheries of the cam plates 33B. These correspond to the flats 245, 246 of the embodiment last described, and serve to apply torque directly to the plungers and so turn the cage carrying the plungers, and consequently the driven shaft, at the direct drive ratio, when the cam plates are indrawn.

The direct drive will be seen to be operative with the parts in the positions shown in Figures 10 and 13. The latter figure shows two of the plungers, designated 230, 231, seated against the flats 245B, 246B in the direct drive position, the detent 37B being seated in the central notch 42B. It will be understood that the plungers 230, 231 are so designated only because of their position. All plungers are alike and whichever is in appropriate position drops into one of the flats as direct drive is instituted.

When the load upon the driven shaft rises to a sufficient value, the interengagement of one of the plungers 230, 231 with the cam plates tends to hold the latter against turning with the driving shaft with increased resistance, and at a predetermined torque, the detent is forced back, and the driving shaft turns until the detent drops into one of the notches 42P, 42Q (depending upon the direction of rotation). The consequent turning of the flat portion 40B of the driving shaft forces the cam plates apart to bring them into their operative positioning, and the same turning of the driving shaft forces out whichever of the plungers 230, 231 is blocking advance movement of the cam plates with respect to the driven cage 25B, the outward movement of such plunger being effected by the contour of the relieved portion 14X of the driving shaft. This contour is such as to bring the unrelieved portion under the end of the plunger in question as the shaft turns to expand the cams (Figures 11 and 14).

The high torque drive, in this embodiment, will be seen to be effective in either direction, while reverse rotation after institution of the high torque drive, immediately returns the apparatus to direct drive.

Another modification, shown in Figures 15-17, corresponds generally to the embodiment last described, but incorporates in addition means whereby the changes of torque ratio may be controlled by a selectively operable shift means under the control of the operator. The cam plates 33C of this embodiment function in like manner and are keyed in like fashion in the driving disc 60C. The disc is rotatable on the driving shaft 140, but independent rotation is restricted by a detent 37C housed and radially shiftable in the driving shaft. The detent is engageable in any of four internal notches formed at intervals of 90° in the interior of the disc 60C. The notches are so arranged that two, diametrically opposed and designated 42C, 42D, are provided with tapered sides conforming to the taper of the end of the detent, while the two others, 42T, 42U, in alternate positions, are provided with abrupt sides so contoured that when the detent falls into either of these it provides a positive drive and cannot be released by torque. When the detent is in either of the notches 42C, 42D, sufficient torque resulting from predetermined loading of the driven shaft with continued driving of the driving shaft, will release the detent, which moves inwardly against the effort of a spring 35C. The spring is housed in the driving shaft, surrounding an axial rod 75 slidable therein. A reversible drive between the detent and rod 75 is provided by an angular pin and slot connection, the pin or key being shown as projecting from the detent into a slot extending diagonally across the rod, at an angle of approximately 45°. At its inner end the rod 75 carries a blocking member 14Z, which, in one position of the rod, prevents inward movement of the plungers to the direct drive position, and in another position allows them to move into such position. The blocking element will be seen to be secured to the rod by means of a pin 77 which extends through a slot (undesignated) in the end of shaft 14C. The outer end of the rod carries a shifting collar 80, fixed thereto by means of a pin 78 and slidable upon the driving shaft 14C, through a slot (undesignated) in which the pin 78 extends. The collar is adapted to be shifted by means of a shifter fork as 82, operable manually or in any other desired or convenient manner.

Assuming the detent to be engaged in one of the notches 42C, 42D, the parts will be seen to be so arranged that at this time the flat section 40C of the driving shaft lies in the position of Figure 16, the cam plates being indrawn and the transmission accordingly in condition to operate in the direct drive ratio. If the torque effort necessary to be applied to the driven shaft rises to a sufficient value, the detent is cammed in, the flattened shaft portion 40C turns to the transverse position to project the cam plates, and the high torque drive is instituted as the detent enters one of the notches 42T, 42D. When lying in one of the latter notches, the plunger projects somewhat farther than when in one of the notches 42C, 42D, and this maintains the blocking member 14Z somewhat farther to the right, as viewed in Figure 15, its position being such that it prevents any of the plungers from moving inwardly far enough to engage in either of the direct drive notches 245C, 246C. In this embodiment, the high torque drive remains in effect until the detent is pulled out of the notch 42T, or 42U, in which it is engaged, by shifting the collar 80 to the left, as viewed in Figure 15, momentarily. This also moves the blocking element 14Z out of the way of the plungers, allowing one of the latter to enter one of the direct drive notches 245C, 246C (in accordance with the direction of rotation) instituting the direct drive as the cam plates move in to free the plungers from engagement with the rack teeth. As soon as sufficient resistance is again encountered to increase the torque sufficiently, the detent is again cammed in and allows the driving shaft to rotate in the disc sufficiently to establish the high torque drive in the manner previously described.

What I claim is:

1. A torque converter of the heliocentric type having in combination with driving and drivable elements, a plurality of drivers reciprocable in and out and having wedge-like cam portions adapted to impart a high torque drive upon rotation of the driving element, a cam portion adapted to occupy an eccentric position to impart such reciprocation, but shiftable to a concentric position in which it is incapable of so reciprocating said drivers, and means responsive to variations in the load imposed upon said drivable element for so shifting said cam portion.

2. A torque converter of the heliocentric type having in combination with driving and drivable elements, a plurality of drivers reciprocable in and out and connected to the drivable element to actuate the same and adapted to impart a high torque drive to the drivable element upon rotation of the driving element, a driving cam portion rotatable by the driving element and operatively connectable to said drivers to reciprocate the same but shiftable to an inoperative position in which it is incapable of reciprocating the drivers, means imposing predetermined resistance to shifting of said cam portion to the inoperative position, and additional driving means providing a driving connection between said driving and drivable elements at a different torque ratio and engageable concurrently with shifting of said cam portion to inoperative position and disengageable concurrently with shifting of said cam portion to the operative position.

3. Means as set forth in claim 2 in which said cam portion is incorporated in the line of drive in position to transmit at least a part of the driving torque to the drivable element, the reaction of the load upon the drivable element being transmitted to said cam portion in a direction such that it tends to urge the cam portion toward said inoperative position, whereby when such reaction exceeds said predetermined resistance said cam portion shifts to the inoperative position.

4. A torque converter of the heliocentric type comprising in combination with driving and drivable elements, a plurality of drivers disposed substantially radially and reciprocable by the driving element to impart a high torque drive to said drivable element, means for reciprocating the drivers in response to rotation of the driving element comprising a cam arranged within the space bounded by the drivers and engageable with the inner ends thereof, said cam being limitedly shiftable independently of the driving element to and from an operative position in which at least a part thereof projects sufficiently to reciprocate the drivers when the cam is rotated with relation thereto, means including a retainer for said drivers, said retainer being connected to the drivable element, means connecting the driving element to the cam but permitting limited independent rotation of one with respect to the other, positive abutment limiting such independent movement and providing for positive drive of the cam by the driving element when said limit of such independent movement has been reached, means for shifting said cam to operative position in response to movement of said driving element and cam to the limit of their relative independent movement, and means for shifting said cam to inoperative position as said driving element and cam move away from such end of their relative movement.

5. Means as set forth in claim 4 in which said means for shifting the cam comprises a second cam carried by the driving element and acting against said first mentioned cam to shift the same laterally.

6. Means as set forth in claim 4 in which said cam comprises a ring having a circular inner opening and an exterior surface non-concentric with respect to said inner opening, said means for shifting the cam comprising an eccentric carried by the driving element and fitting within said inner opening.

7. A torque converter of the heliocentric type comprising in combination with driving and drivable elements, a plurality of reciprocatory drivers disposed substantially radially and reciprocable by the driving element to impart a high torque drive to said drivable element, means for reciprocating the drivers comprising a driving cam arranged within the space bounded by the drivers and engageable with the inner ends thereof, said cam having an operative portion and being limitedly shiftable laterally, and limitedly rotatable independently of the driving element, the operative portion being movable to and from operative position by lateral shifting movement of said cam, and means responsive to independent rotation of the cam and driving element for shifting said cam laterally.

8. Means as set forth in claim 7 in which said means for shifting the cam laterally comprises a supplementary cam portion attached to the driving element and reacting against said driving cam.

9. Means as set forth in claim 7 in which said means for shifting said driving cam laterally comprises a secondary cam actuable by the driving element, means providing driving connection between the driving element and driving cam when the latter is in inoperative position, said driving cam having an abutment portion engageable with one of said drivers when said driving cam is in inoperative position, to impart a low torque drive while said driving cam is in inoperative position, said abutment portion being movable away from such engagement during movement of said driving cam to operative position.

10. Means as set forth in claim 7 in which said means for shifting the cam laterally comprises a secondary cam actuable by independent rotary movement of the driving element with respect to the driving cam, friction means resisting such independent movement, an abutment portion carried by said driving cam and engageable with one of said drivers when said driving cam is in inoperative position, whereby a direct drive may be imparted to said drivable element through said driving element, driving cam, abutment, and reciprocatory driver, said abutment portion and driver being movable out of such engagement to release said direct drive upon movement of said driving cam to operative position, said means for moving the abutment portion and driver out of said engagement including a third cam portion also carried by the driving shaft.

11. Means as set forth in claim 7 including a pair of such driving cams, lateral shifting thereof being effected by radial movement of said cams toward and from one another in said space bounded by the drivers, the means for so shifting said cams comprising a supplementary cam arranged at least partly between said driving cams.

12. Means as set forth in claim 7 including a pair of such driving cams, lateral shifting thereof being effected by radial movement thereof toward and from one another, the means for so shifting said cams comprising a supplementary cam arranged at least partly between said driving cams, means keying said driving cams together for substantially unitary rotation, means resisting independent rotation of said driving cams with respect to the driving element, and means providing a drive at a different torque ratio when said cams are in the indrawn position.

13. Means as set forth in claim 7 including a pair of such driving cams, lateral shifting thereof being effected by radial movement thereof toward and from one another, the means for so shifting said cams comprising a supplementary cam arranged at least partly between said driving cams, means keying said driving cams together for substantially unitary rotation without interfering with their radial shifting toward and from one another, or with their independent rotation with respect to the driving element, locking means for limiting such independent rotation and adapted to releasably hold said driving cams in operative position, personally operable means for releasing said locking means and allowing said driving cams to return to inoperative position, load-responsive means for holding said driving cams in inoperative position, and means controlled by said load responsive means for moving said driving cams to operative position in response to the imposition of a predetermined relative load upon the drivable element.

14. A torque converter of the heliocentric type comprising in combination with driving and drivable elements, a plurality of reciprocatory drivers disposed substantially radially but spaced from and reciprocable toward and from their common center, means for reciprocating said drivers in response to rotation of the driving element to impart a high torque drive to said drivable element, comprising a driving cam arranged within the space bounded by the drivers and engageable with the inner ends thereof, said cam having an operative portion and being limitedly shiftable laterally, and limitedly rotatable, independently of the driving element, said cam being in the form of a ring having substantially circular but non-concentric inner and outer peripheries, the operative portion of said ring comprising the thicker portion thereof, and the means for shifting the ring laterally comprising an eccentric carried by the driving shaft and fitting within the opening in the ring, the throw of said eccentric substantially conforming to the eccentricity of the inner and outer peripheries of the ring, whereby by rotation of the eccentric within the ring the outer periphery of the latter may be moved from concentric to eccentric positions.

15. A torque converter of the heliocentric type comprising in combination with driving and drivable elements, a plurality of reciprocatory drivers disposed substantially radially but spaced from and reciprocable toward and from their common center, means for reciprocating said drivers in response to rotation of the driving element to impart a high torque drive to said drivable element, comprising a driving cam arranged within the space bounded by the drivers and engageable with the inner ends thereof, said cam having an operative portion and being limitedly shiftable laterally, and limitedly rotatable, independently of the driving element, and means for moving the operative portion to and from operative position in response to independent rotation of the cam and driving element, a stepped abutment portion carried by the driving cam and engageable with said lug to limit relative rotation of the cam and driving element and to cause lateral shifting of the cam, said lug lying in a deeper portion of said stepped abutment portion when the cam is in inoperative position, and means imposing predetermined resistance to movement of the cam to operative position.

16. A torque converter of the heliocentric type comprising in combination with driving and drivable elements, a plurality of reciprocatory drivers disposed substantially radially with respect to a common center and spaced from said center, means for reciprocating said drivers in response to rotation of the driving element to impart a high torque drive to said drivable element, comprising a driving cam arranged within the space bounded by the drivers and engageable with the inner ends thereof to successively project the same when the cam is rotated within the space bounded by the drivers, said cam being shiftable to an inoperative position in which it is incapable of operating said drivers, and also being limitedly rotatable independently of the driving element, spring means urging said drivers inwardly, rack means against which said drivers may react when urged outwardly by the cam, means resisting independent rotation of the cam with respect to the driving element, said cam, at least when in one position of its shifting movement, being incorporated in the line of drive between the driving and drivable elements, whereby a variation of driving torque may tend to rotate said cam with respect to the driving element, and means responsive to such independent rotation of the cam with respect to the driving element for shifting the cam.

17. A torque converter of the heliocentric type comprising in combination with driving and drivable elements, a plurality of reciprocatory drivers disposed substantially radially with respect to a common center and spaced from said center, means for reciprocating said drivers in response to rotation of the driving element to impart a high torque drive to said drivable element, comprising a driving cam arranged within the space bounded by the drivers and engageable with the inner ends thereof to successively project the same when the cam is rotated within the space bounded by the drivers, said cam being shiftable to an inoperative position in which it is incapable of operating said drivers, and also being limitedly rotatable independently of the driving element, spring means urging said drivers inwardly, rack means against which said drivers may react when urged outwardly by the cam, means for connecting said cam directly to the drivable element when the cam is in its inoperative position, whereby it may serve as a torque transmitting element incorporated in the line of drive, and whereby a variation of driving torque may tend to rotate said cam with respect to the driving element, and means responsive to such independent rotation of the cam with respect to the driving element for shifting the cam, comprising a supplemental cam movable in response to such independent movement through a predetermined path and operative during movement through such path to shift said driving cam from operative to inoperative position, or vice-versa, means resisting movement of said supplemental cam beyond said predetermined path.

18. A torque converter of the heliocentric type comprising in combination with driving and drivable elements, a plurality of reciprocatory drivers spacedly disposed about a common axis, means for reciprocating said drivers in response to rotation of the driving element, comprising a driving cam arranged within the space bounded by the drivers and engageable with the inner ends thereof to successively actuate the same when the cam is rotated, means against which said drivers may react when so actuated, whereby a high torque drive is imparted to the drivable element, said driving and drivable elements being limitedly rotatable with respect to one another, means resisting such independent rotation, and said cam being shiftable to an operative and an inoperative position, and means responsive to independent rotation of said elements to shift said cam and thereby to render said high torque drive operative and inoperative.

19. A torque converter of the heliocentric type comprising in combination with driving and drivable elements, a plurality of reciprocatory drivers spacedly disposed about a common axis, means for reciprocating said drivers in response to rotation of the driving element, comprising a driving cam arranged within the space bounded by the drivers and engageable with the inner ends thereof to successively actuate the same when the cam is rotated, means against which said drivers may react when so actuated, whereby a high torque drive is imparted to the drivable element, said driving and drivable elements being limitedly rotatable with respect to one another, means resisting such independent rotation at predetermined angular positions of one element with respect to the other, said cam being shiftable to operative and inoperative positions, means for alternately shifting said cam to operative and inoperative positions in response to such independent rotation to said predetermined angular positions, friction means imposing predetermined resistance to movement in the direction necessary to move said cam from inoperative position to operative position, and blocking means positively preventing movement of the cam from operative position to inoperative position in at least one direction.

20. Means as set forth in claim 19 in which said blocking means positively prevents movement of said cam from operative position to inoperative position in either direction, and personally operable means for releasing said blocking means.

FRANK DE BUIGNE.